April 27, 1948.     T. P. BACON, JR     2,440,321

VULCANIZING MOLD

Filed April 27, 1945

INVENTOR.
THOMAS P. BACON, JR.
BY George B White
ATTORNEY

Patented Apr. 27, 1948

2,440,321

UNITED STATES PATENT OFFICE 2,440,321

VULCANIZING MOLD

Thomas P. Bacon, Jr., Oakland, Calif.

Application April 27, 1945, Serial No. 590,599

2 Claims. (Cl. 18—18)

This invention relates to a tire matrix construction for tire vulcanizing molds and the like.

An object of the invention is to provide a matrix construction for a mold whereby tires of various sizes in a wide range can be cured, especially for recapping and retreading operations.

Another object of the invention is to provide a matrix construction for molds which can be very easily replaced and rearranged to accommodate tires of different width, diameter and over-all size.

Another object of the invention is to provide a matrix and mold construction in which the matrix is formed of smaller sections than the sections of the mold and in which firm connection is provided between the matrix and the mold which permits the insertion and removal of the matrix without any fastening operations, and whereby molds can be converted into vulcanizing units of various selected diameters and designs.

Features and advantages of the invention are: the adaptability of a recapping or retreading mold by interchangeably adjusting the mold for retreading or recapping; interchangeable matrices at a minimum cost; reduction of the number of mold units required for recapping, retreading or entire side wall curing in full circle molds by making one mold convertible for the various types of curing; reducing or eliminating the use of aluminum and other critical metals; rendering matrices uniform and interchangeable and adapted for mass production; reducing the weight of molds and also the space required for storing molds and matrices.

Another object of this invention is to provide interchangeable mold elements which are highly useful and simple in construction. Convenience of arrangement, lightness and comparative inexpense of manufacture are further objects which have been borne in mind in the production and development of the invention.

The essential features of the invention involved in the carrying out of the objects indicated are susceptible to modification but a preferred embodiment of the invention is shown in the accompanying drawings, in which.

Figure 1:
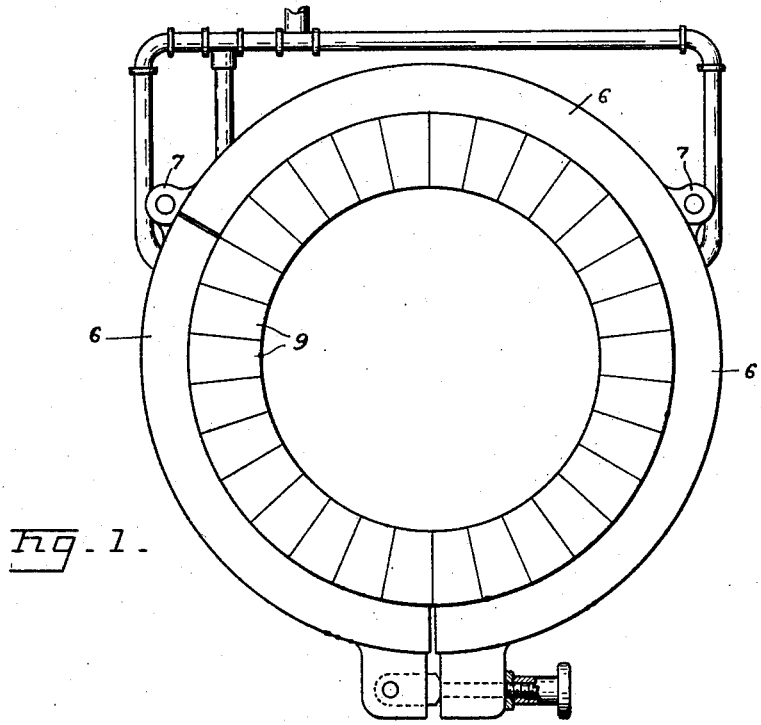
Fig. 1 is a plan view of my multiple matrix installed in a mold.

The mold includes heating members of suitable type. In the present illustration, the mold is shown as sectional full circle mold with heat conducting passages in each section. The sections 6 are hinged together at exterior hinges 7. The heat conducting passages 8 are suitably connected to a heating medium circulated through the sections 6 of the mold in the usual manner. It is to be understood that the mold may be another type of mold and different types of heating methods well known to the art at present may be utilized.

Matrices are used in molds to confine the heating to desired portions of the tire and such matrices usually have a tread design formed in them to cure such design into the new rubber placed upon the tires. The matrices usually are formed with side flanges extending over the crown of the tire in case of recapping, over the shoulders of the tire in case of retreading, and all around the side walls of the tire in case of repair or replacement of the rubber on the entire tire. It is to be understood that the matrices shown in the herein illustrations may be varied in order to adapt them to the various types of operations that may be performed on tires.

A plurality of individual and uniform matrix sections 9 are provided in this invention. These matrix sections 9 are comparatively narrow, so that a considerable number of matrix sections 9 are fitted together to form a matrix unit for any one of the mold sections 6. Each matrix section 9 is adapted for speedy assembly on the mold sections 6. The width of each matrix section is considerably less than the length of mold sections 6. In the present illustration opposed retaining flanges 11 extend from the base 12 of each matrix section 9 in opposite direction than that of the molding flanges 13 of said matrix sections 9. Each retaining flange 12 has a retaining ledge 14 extended substantially inwardly of the mold which slidably fits into grooves 16 in the top and bottom of the mold sections 6. The grooves 16 are open at their ends or at least at one end thereof so as to allow the lengthwise sliding of the ledges 14 therein longitudinally of the mold sections 6. The grooves 16 are arcuate in each section so that in the closed mold the groove 16 forms a circle concentric with the mold. The flanges 12 are of such width that the base of the matrix section 9 is in heat conductor contact with the inner periphery of the mold section 6.

Figure 2:
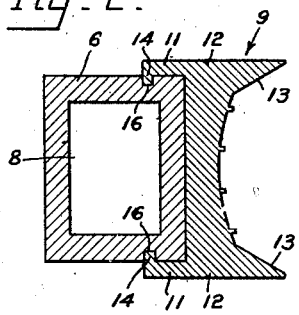
Fig. 2 is a sectional view of a matrix section on the mold.
Figure 3:
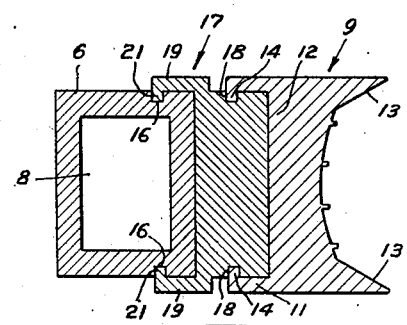
Fig. 3 is a sectional view of a matrix section and spacer block installed together on a mold.
Figure 4:
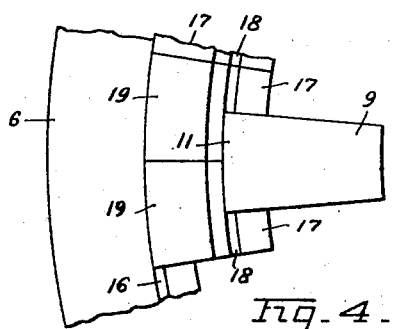
Fig. 4 is a fragmental plan view of said matrix section and spacer block installed on a mold.

The base of the matrix sections 9 may be made thinner or thicker as shown in Fig. 2, to accommodate tires of different diameters. In order to prevent excessive thickness of matrix and also to permit the use of the same matrix sections 9 on tires of various diameters, I provide a plurality of spacer blocks 17. Each spacer block 17 fits against the base of one of the matrix sections 9, and the matrix sections 9 may be assembled on the spacer blocks 17 by inserting the ledges 14 of the matrix section 9 into grooves 18 on the top and bottom of said spacer blocks 17. From the spacer blocks 17 extend retaining flanges 19 with retaining ledges 21 oppositely extended therefrom which latter slidably fit into the top and bottom grooves 16 of the mold sections 6. The flanges 19 are of such width that the spacer blocks 17 are in heat conductor contact with the inner periphery of the mold sections 6. The matrix sections 9 are then in heat conductor contact with the spacer blocks 17. Each spacer block 17 has a face which engages the base of the matrix sections 9 and it has a recess between the retaining flanges which fits over the mold sections 6 so as to conduct heat from the mold section to the matrix sections 9. The spacer blocks 17 are made of heat conducting material.

It is to be noted that the spacer blocks 17 are also made of smaller sections so that by selecting spacer blocks 17 of the same thickness and sliding them in place in the grooves on the mold sections 6 a base is formed on which the numerous matrix sections 9 of the desired design may be slid in place. It is preferable that the spacer sections 17 and the matrix sections 9 be of corresponding width. The assembly of the spacer sections 17 and the matrix sections 9 on the mold is very quickly accomplished by simply sliding the respective elements in the respective grooves in end to end abutting relation. Each matrix section 9 may be assembled on one spacer section 17 and the unit thus formed is slid in place on the mold section 6. The mold can be converted to a different design or a different diameter by replacing the spacer sections 17 and the matrix sections 9 quickly. This permits the use of the same mold for performing on the tire a variety of operations or to perform the same operation on tires of different sizes and designs. It operates efficiently and quickly, it does not require any complicated adjustment or skill for operation and is easily adapted for use by labor ordinarily available.

I claim:

1. In combination with a sectional circular tire mold adapted to be opened, each mold section being arcuate and having arcuate retaining grooves thereon concentric with the mold, a plurality of spacer elements on each section of the mold, retaining elements extended from said spacer elements over the top and bottom of each of said mold sections and being longitudinally slidable in said grooves to hold said spacer elements in place, arcuate grooves in said spacer sections concentric with said first grooves on said mold sections, a plurality of matrix sections larger in number than said mold sections, each of said matrix sections being circumferentially smaller than any one of said mold sections, retaining elements extended from each of said matrix sections over the respective spacer sections and being longitudinaly slidable in the grooves of said spacer sections, said matrix sections complementing each other to form the curing cavity on said mold sections.

2. In combination with a sectional circular tire mold adapted to be opened, each mold section being arcuate and having arcuate retaining grooves thereon concentric with the mold, a plurality of spacer elements on each section of the mold, retaining elements extended from said spacer elements over the top and bottom of each of said mold sections and longitudinally slidable in said grooves to hold said spacer elements in place, arcuate grooves in said spacer sections being concentric with said first grooves on said mold sections, a plurality of matrix sections larger in number than said mold sections, each of said matrix sections being circumferentially smaller than any one of said mold sections, retaining elements extended from each of said matrix sections over the respective spacer sections and being longitudinally slidable in the grooves of said spacer sections, said matrix sections complementing each other to form the curing cavity on said mold sections, said spacer elements being in heat conducting contact with said mold sections and with said matrix sections.

THOMAS P. BACON, Jr.

REFERENCES CITED

The following references are of record in the file of this patent:

UNITED STATES PATENTS

| Number | Name | Date |
|---|---|---|
| 1,876,100 | Thorsen | Sept. 6, 1932 |
| 1,899,258 | Bush | Feb. 28, 1933 |
| 1,969,083 | Lawson | Aug. 7, 1934 |
| 1,980,134 | Grange | Nov. 6, 1934 |
| 1,989,646 | Tuttle | Jan. 29, 1935 |
| 1,996,971 | Murphy | Apr. 9, 1935 |
| 2,152,765 | Kite et al. | Apr. 4, 1939 |
| 2,345,172 | Bacon | Mar. 28, 1944 |

FOREIGN PATENTS

| Number | Country | Date |
|---|---|---|
| 418,930 | Great Britain | Nov. 2, 1934 |